FRAMES FOR ELECTRICAL COMMUNICATION APPARATUS

Original Filed Dec. 15, 1961

FRAMES FOR ELECTRICAL COMMUNICATION APPARATUS

Original Filed Dec. 15, 1961

FRAMES FOR ELECTRICAL COMMUNICATION APPARATUS

Original Filed Dec. 15, 1961 6 Sheets-Sheet 5

United States Patent Office 3,394,287
Patented July 23, 1968

3,394,287
FRAMES FOR ELECTRICAL COMMUNICATION APPARATUS

Werner Zitzmann, Gauting, near Munich, and Ludwig Waginger, Munich, Germany, assignors to Siemens Aktiengesellschaft, Munich, Germany, a corporation of Germany Continuation of application Ser. No. 159,558, Dec. 15, 1961. This application Feb. 9, 1967, Ser. No. 615,026
Claims priority, application Germany, June 26, 1961
S 74,502
4 Claims. (Cl. 317—99)

ABSTRACT OF THE DISCLOSURE

Racks or frames for apparatus employed in telecommunications carrier frequency systems with removable units having electrical connections which are made by plugs and sockets and which have a central switching and controlling panel are disclosed.

CROSS-REFERENCE TO RELATED APPLICATION

This application is a continuation of application Ser. No. 159,558, filed Dec. 15, 1961 entitled "Frames for Electrical Communication Apparatus," by Werner Zitzmann and Ludwig Waginger.

Background of the invention

*Field of the invention*

The invention disclosed herein is concerned with racks or frames for apparatus employed in the telecommunications carrier frequency systems and particularly to devices with removable units having electrical connections which are made by plugs and sockets and has a central switching and controlling panel to which the removable units are connected.

*Description of the prior art*

It is known to equip frames with slidably insertable apparatus units, which may be subdivided into further components, and to connect such units or components with plug-in connectors and individual wiring for each unit, with a central terminal board which is usually disposed in the upper portion of the frame. The terminal board contains feeders comprising soldering tabs to which are connected exchange cables.

These prior art terminal assemblies require relatively large space since the soldering must be performed within the assembled unit and cabinet. Also, each of these many individual soldering points must be accessible for accurate checking or testing. A reduction of the size of the soldering tabs and the terminal assembly is possible only within definitely set limits which are inherently determined by the soldering and testing operations which are to be performed.

Other known frames have terminal assemblies comprising plug-in terminal distributors instead of soldering tab distributors. The exchange cable conductors as well as the conductors of the frame wiring terminate at the corresponding plug-in terminal connectors and reduction of the size of the terminal assemblies in such cases is difficult to achieve.

The frame wiring required in such cases, extending from the terminal assembly to the plug-in connectors of the respective apparatus units, and which must be frequently conducted over a prearranged panel which is mounted in position at the factory, forms an inherent part of the frame. While the necessary operations can be carried out efficiently at the factory, a great amount of space is required. The extensive frame wiring is often of a complicated character and must be accurately controlled and tested. Moreover, such wiring must always be provided for the full frame apparatus capacity, since additions after installation, in switch rooms of an exchange is impractical if not impossible.

Plug-in wiring units which may be installed in prewired frames are also known, such wiring units are less unwieldy than the cabinet frames and can be assembled more readily. The frame wiring for a cabinet frame is subdivided into a plurality of wiring units, whereby the cost is increased because of the additional plugs and sockets which have to be provided on all sides of the wiring units.

Frames which have a fixed switching or testing panel which is provided, for example, for the purpose of testing and supervising incoming and outgoing lines, are also known. Two-pole bushing-like disconnect jacks with plug connectors are usually employed for this purpose. Such testing panels or assemblies may be easily serviced. Instead of employing a fixed built-in testing panel, it has been proposed to mount in the individual horizontally and vertically superposed apparatus units, at their front lower margins, strips of disconnect jacks for the lines of the various apparatus units. These individual test jack strips are distributed over the entire height of the cabinet frame, thereby nullifying the advantages of a centrally positioned test jack panel.

Transistorizing of communication equipment and the miniaturizing of the component parts has resulted in reduced size of the apparatus units or more units in a cabinet of a particular size.

However, the realizable overall advantage is less than would be expected because there are limits to the reduction in size of the apparatus units based on operating reliability in communications and partially from methods of construction. Mounting a relative large number of apparatus units in a cabinet frame requires that the terminal assembly be designed for the connection of a correspondingly greater number of exchange cables. The size of the terminal elements cannot be readily reduced, and the size of the terminal assembly will become larger and the space available for the apparatus units will be reduced.

SUMMARY OF THE INVENTION

This invention allows a large number of smaller apparatus units to be mounted in a cabinet frame.

While the wiring within the apparatus units can be simplified, for example, by the use of printed circuits, and while the further wiring in the wiring planes of the prefabricated apparatus and component units can be well accommodated even in the structures of reduced size, the cost of the frame wiring increases considerably with the increase of apparatus units.

Since the frame wiring must always be laid out for the full frame apparatus capacity, it becomes expensive.

The present invention improves the known techniques of building apparatus frames and component parts including the terminal means and the wiring, so as to permit more compact and reliable units to be mounted in a frame of given size.

An apparatus frame according to this invention comprises a plurality of partial circuit subassemblies having individual slidably insertible apparatus units and such circuit assemblies form at least one switch board or panel which is centrally mounted preferably in front of the terminal assembly. The terminal assembly contains connector strips for direct connection with the conductors of an exchange cable. The connector strips form one-half of the plug-in connectors and the other halves are mounted in the apparatus units. The terminal assembly and the connector strips which provide connections to the apparatus units, are identical, and thus avoid any frame wiring. This saves considerable space. As contrasted with a frame provided with a complete built-in wiring which is all utilized only with full frame apparatus capacity, the invention permits economical wiring for partial capacity. Also, many soldering- and/or plug-in connections are eliminated. The terminal assembly is arranged near the rear wall and since the connectors associated with the exchange cables are insertible between the frame and the rear wall, it is possible to place the exchange cables compactly against the inside of the rear wall of the apparatus frame. The identical construction of the terminal assembly and the arrangement of the connector strips for the connections to the apparatus units and the central location of the corresponding parts eliminates not only all the frame wiring, but additional connector strips. This results in a further saving of space and the cables can be laid out within the space between the apparatus units and the rear wall of the frame. This also leaves much room for building-in additional parts and has good accessibility from the front of the frames, so that the frames can be readily positioned back-to-back or backed against a wall. The particular arrangement and construction of the terminal assembly makes it possible to remove to insert the part of the terminal assembly corresponding to a particular apparatus unit.

The sub-frame for the terminal assembly is mounted so that it may be easily removed. It could be pivotally mounted, for example.

Another advantage of the invention results from the terminal assembly being mounted at the rear of the frame, but is totally or at least partially accessible from the front, without requiring removal or pivotal displacement. When the exchange cables are placed along the side of the apparatus units only a single unit need be removed, to make accessible the connector strips which supply the removed unit.

The invention provides, at the middle of the frame, two vertically superposed horizontally extending switch or circuit panels with the upper one comprising switching means for the units disposed vertically in the upper portion of the frame, and the lower row of switch panels comprising partial switching means for the apparatus units disposed vertically in the lower portion of the frame. In this embodiment, there are provided insertion devices, respectively at the top and bottom of the frame, for receiving apparatus units. The two centrally positioned switch or circuit panels are spaced apart so as to permit further apparatus, such as current supplies and readout devices and/or components such as carrier repeaters, to be mounted between them.

Various objects and features of the invention will appear from the description of the embodiments which will be rendered below with reference to the accompanying drawings.

BRIEF DESCRIPTION OF THE DRAWINGS

FIG. 5*a* is front elevational view of the exchange cable connectors showing their attachment to the terminal assembly, while FIG. 5*b* is a sectional view taken approximately on the line **5*b*—5*b*** of FIG. 5*a*; and FIG. 5*c* is a sectional view taken approximately on the line **5*c*—5*c*** of FIG. 5*a*.

DESCRIPTION OF THE PREFERRED EMBODIMENTS

Figure 1:
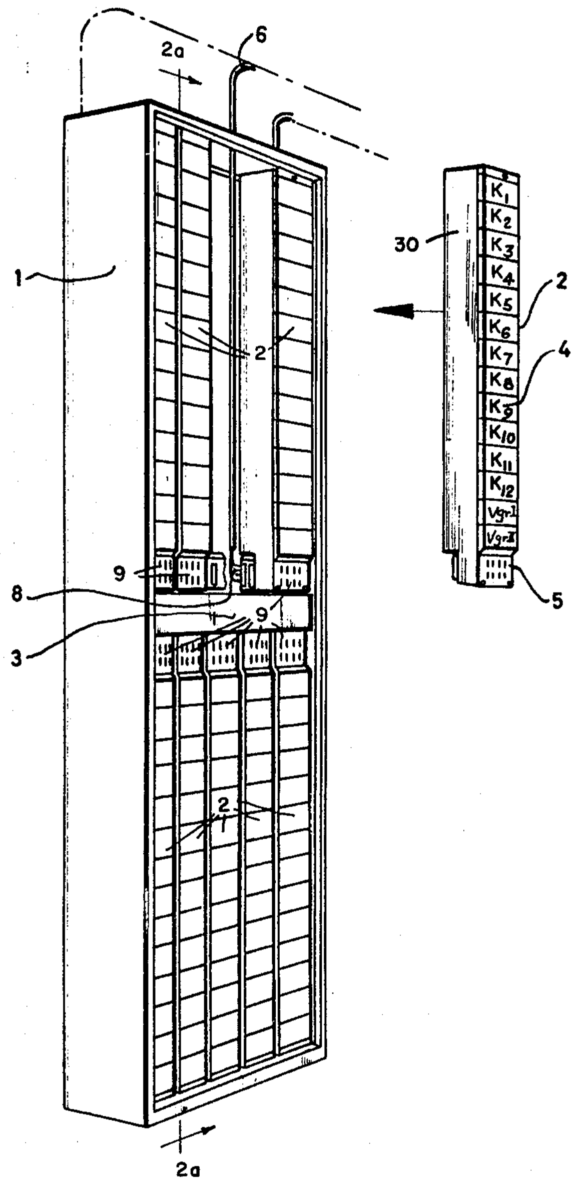
FIG. 1 shows a frame equipped with apparatus units, one of which has been withdrawn from the frame.

As shown in FIGURE 1, an apparatus frame 1 holds equipment for 120 channels, which could be ten basic groups. The apparatus frame accommodates ten apparatus units 2, such units respectively containing the apparatus and circuits for one basic group. A receiving bracket 7 (see FIG. 2*a*) is mounted in the apparatus frame at its middle and receives at the front, the current supply cable X and the readout or testing device 3, and at the rear, the plugs 8 of the exchange wiring 6. The apparatus unit 2 comprises a tray-like container 30 for accommodating twelve plug-in channel converter component groups 4, labeled K1–K12, and two component groups **4*a***, labeled V*gr*I and V*gr*II, for pre-group converters and group amplifier. At one end of apparatus unit 2 is a switchboard 5 for twelve channels.

Figure 2A:
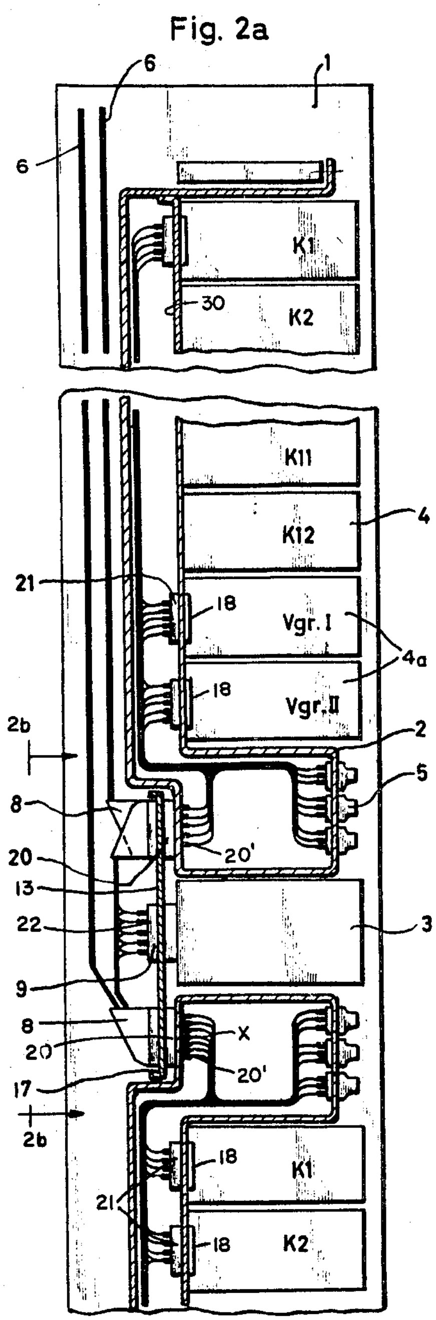
FIG. 2*a* is a sectional view of the frame, taken approximately on the line **2*a*—2*a*** of FIG. 1.
Figure 2B:
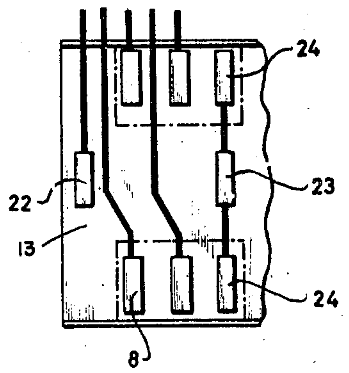
FIG. 2*b* is a sectional view, taken approximately on the line **2*b*—2*b*** of FIG. 2*a*, showing a rear view of the receiving frame.

The interior structure of the apparatus frame 1 is shown in FIG. 2*a*. The exchange cables 5 terminate at multiple plug-in connectors 8 which are fastened to the upper and lower portions of receiving frame 7. The apparatus units 2 have similar mating plug-in connector strips 20 which mate with connectors 8. These plugs connect the apparatus units 2 through connector strips 20 to the exchange wiring provided on a plate 13 mounted to the receiving frame 7. Wiring extends between the connectors 20′ of the respective apparatus units 4 to the switchboard 5 at the front of the corresponding apparatus unit, through the plug-in connectors 21 which are engaged by the cooperable plug-in connectors 18 of the component groups 4. The apparatus units 2 are also connected to the carrier voltages and the operating voltages. These voltages are supplied through plug-in connector 22 which is fastened to the plate 13 in the receiving frame in the same manner as the connector strips 20, being however, positioned midway of the receiving frame 7 and being engageable with a cooperable connector for the current supply insert (see FIG. 2*b*). The voltages are supplied over multiple plug-in connectors to the apparatus units.

Figure 3:
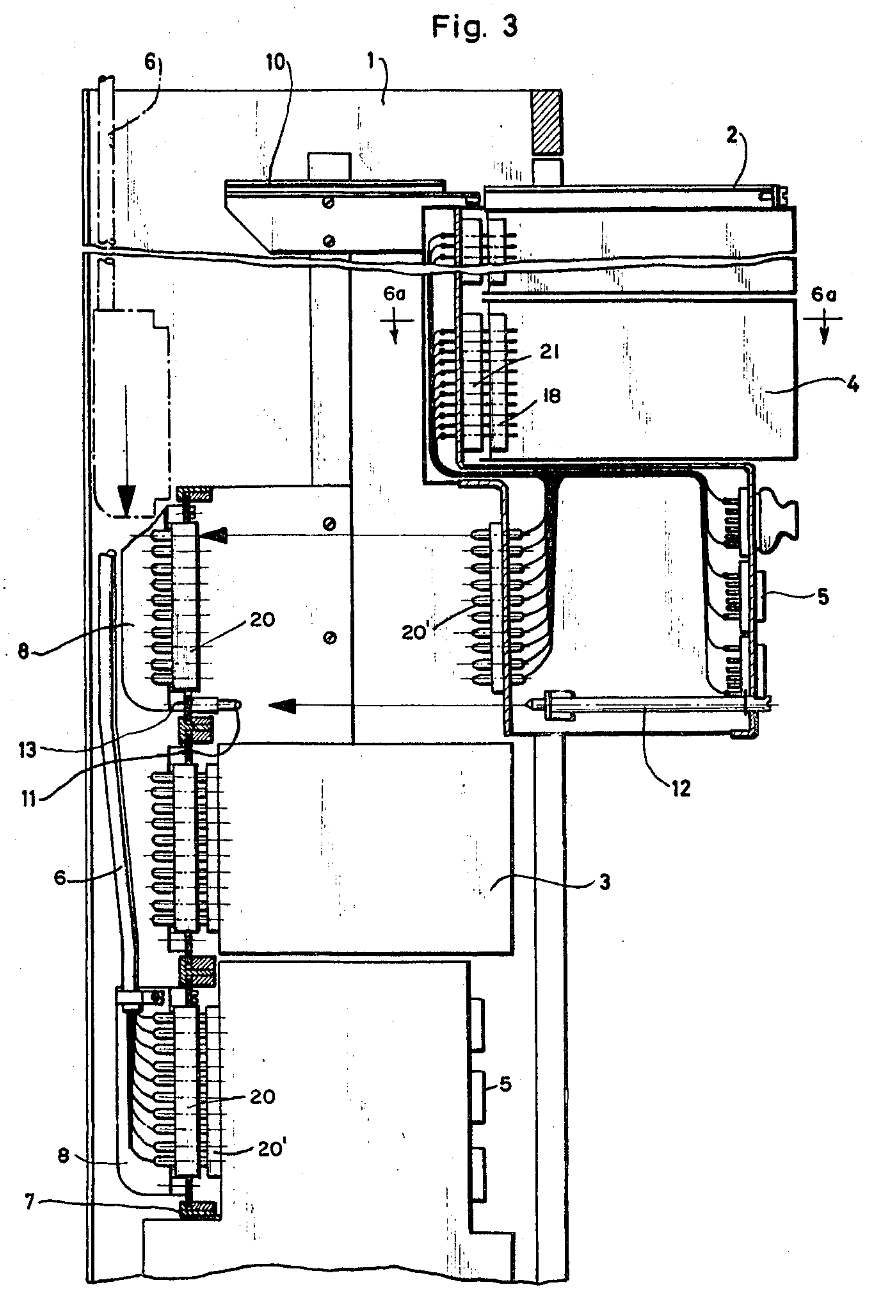
FIG. 3 represents a sectional view, similar to FIG. 2*a*, of the frame with emphasis on details of the mechanical fastening means.

FIG. 3 shows another sectional view through the apparatus frame and illustrates the fastening of the apparatus units 2. An apparatus 2 is received at the upper end in a guide 10 and fastened in position by means of cooperable location members, as for example, an internally threaded stud element 11 in which may be inserted the threaded end of a bolt 12. The plate 13, which carries the stud element 11 as well as the multiple connectors 8, is movably mounted within the receiving frame 7 to allow alignment. The apparatus units 2 of the lower portion of the apparatus frame are fastened in similar manner by guide and location means but in inverted positions with respect to the units of the upper portion.

Figure 4A:
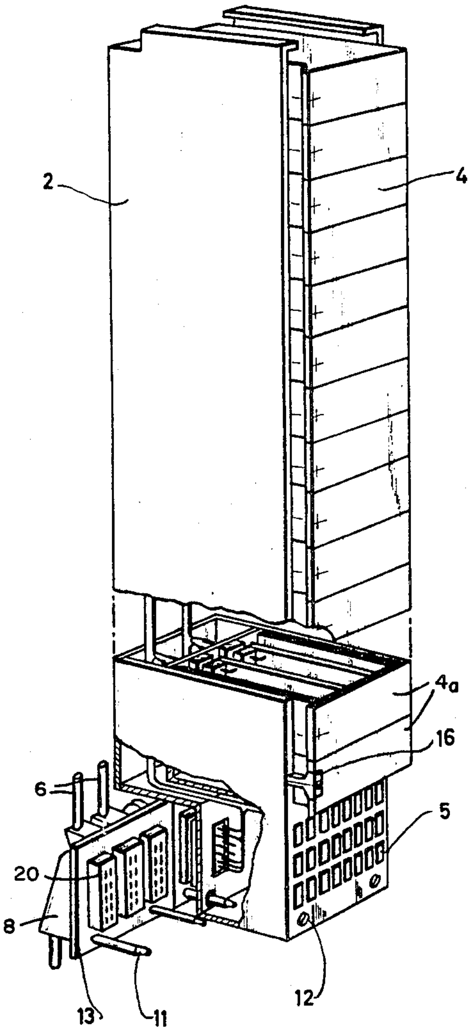
FIG. 4*a* shows an apparatus unit and a portion of the terminal or connector assembly as seen from the front.
Figure 4B:
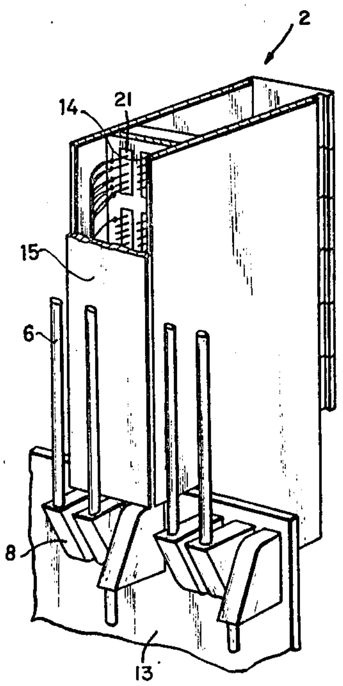
FIG. 4*b* shows the rear thereof.

FIGS. 4*a* and 4*b* show an apparatus unit 2, which is constructed in tray-like fashion and includes guide bars and fastening elements 16 for receiving fourteen plug-in groups 4, the plug-in connectors 18 of which establish engagement with plug-in connectors 21 disposed in the wall 14 of the apparatus unit. The wiring extending from the connectors 21 to the switchboard 5, and to the plug-in connectors 20′, which connect with connector strips 20 in the receiving frame, is mounted at the rear side of the wall 14 and is protected by a cover 15.

Figures 5A, 5B, 5C:
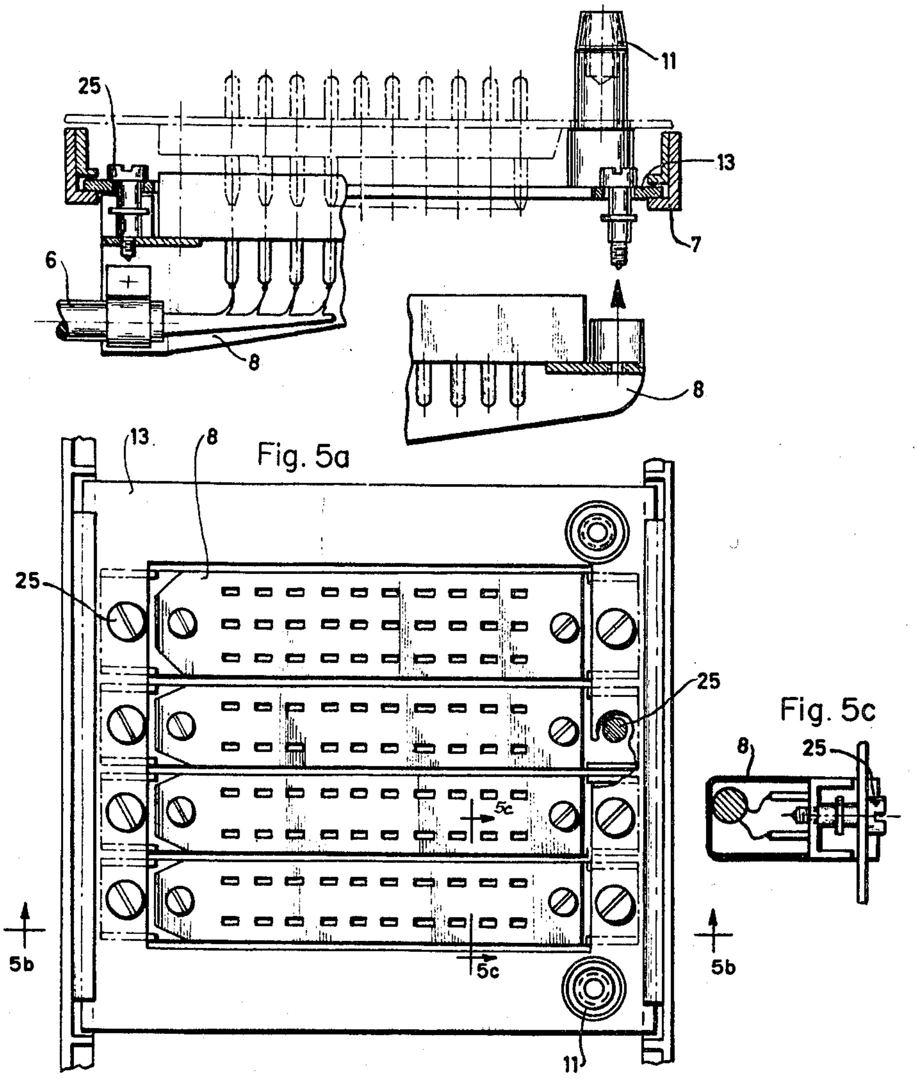
Figure 6B:
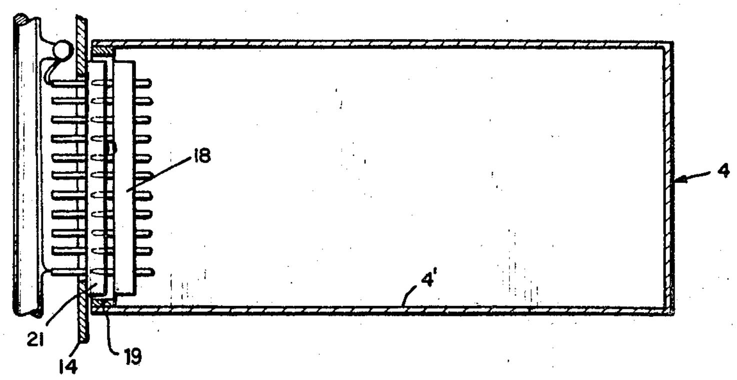
FIG. 6*b* is a sectional view taken approximately on the line **6*b*—6*b*** of FIG. 6*a*.
Figure 6A:
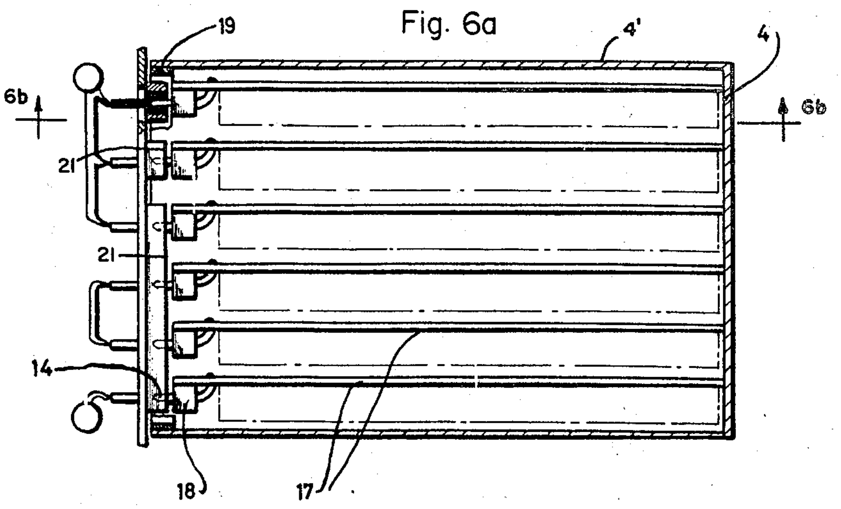
FIG. 6*a* is a sectional view of a component group and its connections to the associated apparatus unit, taken approximately on the line **6*a*—6*a*** of FIG. 3.

FIGS. 5*a* and 5*b* show a portion of the receiving frame 7, which is connected with an apparatus unit 2. The figures show particularly the manner in which the cable plug 8 may be fastened in a movable manner by screws 25.

It is seen that the invention lies in the construction of communication carrier equipment to be mounted in a frame 1 and which comprises apparatus units 2 which are mounted in the frame. For example, FIG. 1 shows ten such apparatus units mounted in the frame 1 with the upper and lower units 2 turned upside down to each other. One end of each unit 2 has a plug-in unit 5, and a readout or testing panel 3 is mounted between the upper and lower units 2.

Each unit 2 is formed of component groups or modules 4.

The main feed cables 6 are connected to the units 2 and control panel 3 at the center of frame 1, as is well shown in FIG. 2*a*.

The invention eliminates all cable harnesses normally found in equipment of this type which requires much space. Each module 4 and equipment pack or apparatus unit 2 includes its own individual electrical circuitry and each unit is connected and interconnected by plugs and sockets and connector strips. The plug-in units 5 and readout and testing panel 3 allow connections to be made between the equipment at a central location.

Thus, the extensive wiring harness normally found in such equipment is eliminated.

The equipment is arranged vertically rather than horizontally and may be assembled at the installation site. Only a few rugged components are required which do not contain any fixed cabling.

The bays are fitted with the vertical equipment pack 2 which contain the modules 4. The equipment packs 2 are assembled with control panels 3 mounted between them (units 2 are above and below panel 3).

The elimination of cabling, flexibility of assembly and the case and speed of construction are major advantages of the invention.

Repairs are very simple also, as a unit 2 or a module 4 may be easily replaced when desired.

The principles of the invention explained in connection with the specific exemplifications thereon will suggest many other applications and modifications of the same. It is accordingly desired that in construing the breadth of the appended claims they shall not be limited to the specific details shown and described in connection with exemplification thereof.

We claim:

1. A structure of electrical communication apparatus comprising, a frame structure, a plurality of vertical equipment packs receivable within the frame member and having switchboard portions at one end thereof, a control panel mounted centrally in said frame, a first portion of the plurality of equipment packs mounted side by side above the control panel, a second portion of the plurality of equipment packs mounted side by side below the control panel, and the switchboard portions of the first and second portions of the equipment packs mounted adjacent the control panel, first electrical connectors mounted to the frame and the equipment packs for interconnecting the equipment packs and the control panel at the rear of the equipment packs, and second electrical connectors for connecting the switchboard portions and control panel at the front of the frame.

2. Apparatus according to claim 1 wherein the first connectors at the rear of the equipment packs and frame are plug and socket connectors.

3. Apparatus according to claim 2 wherein each equipment pack is composed of a plurality of modules interconnected to form an operative unit.

4. Apparatus according to claim 2 wherein monitoring and control means may be connected to the second electrical connectors.

References Cited

UNITED STATES PATENTS

| | | | |
|---|---|---|---|
| 2,438,371 | 3/1948 | Marholz | 317—120 X |
| 3,014,160 | 12/1961 | Brogden | 317—99 X |
| 3,177,404 | 4/1965 | Patmore | 317—99 |
| 3,206,622 | 9/1965 | Maki et al. | 317—101 XR |
| 3,218,518 | 11/1965 | Ashbridge et al. | 317—101 |

FOREIGN PATENTS

| | | |
|---|---|---|
| 1,106,834 | 5/1961 | Germany. |

ROBERT S. MACON, *Primary Examiner.*